(12) United States Patent
Sun (10) Patent No.: US 9,208,220 B2
(45) Date of Patent: Dec. 8, 2015

(54) METHOD AND APPARATUS OF TEXT CLASSIFICATION

(75) Inventor: Xiang Sun, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 372 days.

(21) Appl. No.: 12/996,658

(22) PCT Filed: Sep. 3, 2010

(86) PCT No.: PCT/US2010/047868
§ 371 (c)(1),
(2), (4) Date: Dec. 7, 2010

(87) PCT Pub. No.: WO2011/093925
PCT Pub. Date: Aug. 4, 2011

(65) Prior Publication Data
US 2011/0213777 A1 Sep. 1, 2011

(30) Foreign Application Priority Data
Feb. 1, 2010 (CN) .......................... 2010 1 0104512

(51) Int. Cl.
*G06F 17/30* (2006.01)
(52) U.S. Cl.
CPC ................ *G06F 17/30707* (2013.01)
(58) Field of Classification Search
CPC ................................... G06F 17/30707
USPC ......................................... 707/740
See application file for complete search history.

(56) References Cited

U.S. PATENT DOCUMENTS

| | | | |
|---|---|---|---|
| 4,658,429 A * | 4/1987 | Orita et al. | 382/225 |
| 6,513,027 B1 | 1/2003 | Powers et al. | |
| 6,611,825 B1 | 8/2003 | Billheimer et al. | |
| 6,735,578 B2 | 5/2004 | Shetty et al. | |
| 6,751,621 B1 * | 6/2004 | Calistri-Yeh et al. | 1/1 |
| 6,868,411 B2 | 3/2005 | Shanahan | |
| 7,024,408 B2 | 4/2006 | Dehlinger et al. | |

(Continued)

FOREIGN PATENT DOCUMENTS

| | | |
|---|---|---|
| JP | 2007041721 A | 2/2007 |
| JP | 2009116593 A | 5/2009 |
| JP | 2009157660 A | 7/2009 |

OTHER PUBLICATIONS

Translated Japanese Office Action mailed Mar. 4, 2014 for Japanese patent application No. 2012-551145, a counterpart foreign application of U.S. Appl. No. 12/996,658, 6 pages.

(Continued)

*Primary Examiner* — Grace Park
(74) *Attorney, Agent, or Firm* — Lee & Hayes, PLLC (57) ABSTRACT

The present disclosure provides a technique of text categorization to simplify and optimize the classification. In one aspect, a method parses a given text into one or more words; determines a word vector in a spherical space model for one of the one or more words, a number of dimensions of the spherical space being equal to a number of categories, each category corresponding to a spherical space category vector; for each category, determines a distance between a sum of word vectors of the one or more words and the respective category vector; and classifies the text into one or more categories with the shortest distance. The present disclosure also provides an apparatus used to implement the method.

15 Claims, 6 Drawing Sheets

(56) References Cited

U.S. PATENT DOCUMENTS

| | | |
|---|---|---|
| 7,509,578 B2 | 3/2009 | Rujan et al. |
| 7,779,349 B2 | 8/2010 | Spangler |
| 2004/0019601 A1* | 1/2004 | Gates .......................... 707/102 |
| 2004/0083224 A1 | 4/2004 | Yoshida |
| 2005/0228783 A1 | 10/2005 | Shanahan et al. |
| 2005/0234955 A1 | 10/2005 | Zeng et al. |
| 2006/0085405 A1 | 4/2006 | Hsu et al. |
| 2006/0212294 A1* | 9/2006 | Gorin et al. ................... 704/245 |
| 2008/0177736 A1 | 7/2008 | Spangler |
| 2008/0183471 A1 | 7/2008 | Atal |

OTHER PUBLICATIONS

The Extended European Search Report mailed Jan. 26, 2015 for European Patent Application No. 10844913.3, 11 pages.

Lebanon, "Metric Learning for Text Documents", IEEE Transactions on Pattern Analysis and Machine Intelligence, IEEE Computer Society, vol. 28, No. 4, Apr. 1, 2006, pp. 497-508.

* cited by examiner

METHOD AND APPARATUS OF TEXT CLASSIFICATION

CROSS REFERENCE TO RELATED PATENT APPLICATIONS

This application is a national stage application of an international patent application PCT/US10/47868, filed Sep. 3, 2010, which claims priority from Chinese Patent Application No. 201010104512.4 filed on Feb. 1, 2010, entitled "Method and Apparatus of Text Classification," which applications are hereby incorporated in their entirety by reference.

TECHNICAL FIELD

The present disclosure relates to the field of computer and communications and, more particularly, to the method and apparatus of text classification.

BACKGROUND

Text classification is an important component of text mining. It is based on predefined subject categories, and files are each assigned to a category. This automatic text classification system can help people find needed information more effectively. In one aspect, classifying information is one of the most fundamental cognitive processes. Moreover, conventional classification researches have produced enriching results and practical uses. Nevertheless, with the rapid growth of text messaging, especially the proliferation of online text messages, text classification is considered the key technology in processing and organizing large quantities of data. At present, text classification is widely used in various fields. However, due to the general increase in web-based information, demands for higher accuracy, and better verification, the demand for text classification technology is also growing. Accordingly, constructing an effective text classification system is still one of the main areas of research in the field of text mining.

In the field of natural language processing, texts are mainly represented using the vector space model (VSM). This method considers that each text contains a working concept used to express its independent attribute, and each attribute can be regarded as a dimension of the concept. These independent attributes are called text features wherein the text can express a set of characteristics. Furthermore, vectors often use the cosine of the angle method to measure a degree of similarity. Then the degree of similarity between the text vector and the vector of the candidate category is used to categorize the text.

With current technologies, one has to calculate the degree of similarity between the text vector and the candidate category. Each computation is quite lengthy and uses the angle of cosine to arrive at a measurement. Furthermore, the semantics of current technologies do not have any specification, and the classification is not very accurate.

SUMMARY OF THE DISCLOSURE

The present disclosure provides an exemplary implementation of a method of text categorization used to simplify and optimize the classification.

In one aspect, a method of text classification comprises: parsing a given text into one or more words; determining a word vector in a spherical space model for one of the one or more words, a number of dimensions of the spherical space being equal to a number of categories, each category corresponding to a spherical space category vector; for each category, determining a distance between a sum of word vectors of the one or more words and the respective category vector; and classifying the text into one or more categories with the shortest distance.

The method may also filter the one or more words to provide one or more filtered words that meet filtering conditions.

The distance between the sum of word vectors of the one or more words and the respective category vector may be a straight line or a spherical arc.

A word vector of a word may include one or more normalized word frequency values of the word in respective one or more categories, where the spherical space model may include a multi-dimensional sphere model having a unit length as a radius. The unit length may be 1.

In determining a distance between a sum of word vectors of the one or more words and the respective category vector, the method may accumulate normalized word frequency values of the one or more words to provide a normalized word vector sum, and classify the text into categories corresponding to a largest component of the normalized word vector sum.

In another aspect, an apparatus for text classification may include: a parsing module that parses a given text into one or more words; a query module that determines a word vector in a spherical space model for one of the one or more words, a number of dimensions of the spherical space being equal to a number of categories, each category corresponding to a spherical space category vector; a calculation module that, for each category, determines a distance between a sum of word vectors of the one or more words and the respective category vector; and a classification module that classifies the text into one or more categories with the shortest distance.

The apparatus may further include a filter module that the one or more words to provide one or more filtered words that meet filtering conditions.

The distance between the sum of word vectors of the one or more words and the respective category vector may be a straight line or a spherical arc.

A word vector of a word may include one or more normalized word frequency values of the word in respective one or more categories, where the spherical space model may include a multi-dimensional sphere model having a unit length as a radius. The unit length may be 1.

The calculation module may accumulate normalized word frequency values of the one or more words to provide a normalized word vector sum. The classification module may classify the text into categories corresponding to a largest component of the normalized word vector sum.

In yet another aspect, one or more computer-readable storage media having stored thereupon computer-executable instructions that, when executed by one or more computers, perform acts comprising: parsing a given text into one or more words; determining a word vector in a spherical space model for one of the one or more words, a number of dimensions of the spherical space being equal to a number of categories, each category corresponding to a spherical space category vector; for each category, determining a distance between a sum of word vectors of the one or more words and the respective category vector; and classifying the text into one or more categories with the shortest distance.

The acts may also include filtering the one or more words to provide one or more filtered words that meet filtering conditions.

The distance between the sum of word vectors of the one or more words and the respective category vector may be a straight line or a spherical arc.

A word vector of a word may include one or more normalized word frequency values of the word in respective one or more categories, where the spherical space model may include a multi-dimensional sphere model having a unit length as a radius. The unit length may be 1.

In determining a distance between a sum of word vectors of the one or more words and the respective category vector, normalized word frequency values of the one or more words may be accumulated to provide a normalized word vector sum, and the text may be classified into categories corresponding to a largest component of the normalized word vector sum.

The present disclosure pre-constructs a spherical space model. Moreover, this model classifies texts into categories by calculating the distance between each word vector and each category vector. The present disclosure describes text classification where the amount of calculation is substantially lessened compared with the existing angle cosine algorithm technique. The spherical space model uses the unit length as the radius. The unit length is also sum of the square of the normalized word frequency value of the words in each category. The unit length is equivalent and limited to the semantic information quantity of the words. Accordingly, in relation to current technologies, the present disclosure can further optimize text classification.

DETAILED DESCRIPTION

The present disclosure pre-constructs a spherical space model. Moreover, this model classifies texts into categories by calculating a distance between each word vector and each category vector. The present disclosure describes text classification where the amount of calculation is substantially lessened compared with the existing angle cosine algorithm technique. The spherical space model uses the unit length as the radius. The unit length is also a sum of the square of the normalized word frequency value of the words in each category. The unit length is equivalent and limited to the semantic information quantity of the word. Accordingly, in relation to the current technologies, the present disclosure can improve the accuracy of text classification.

Figure 1:
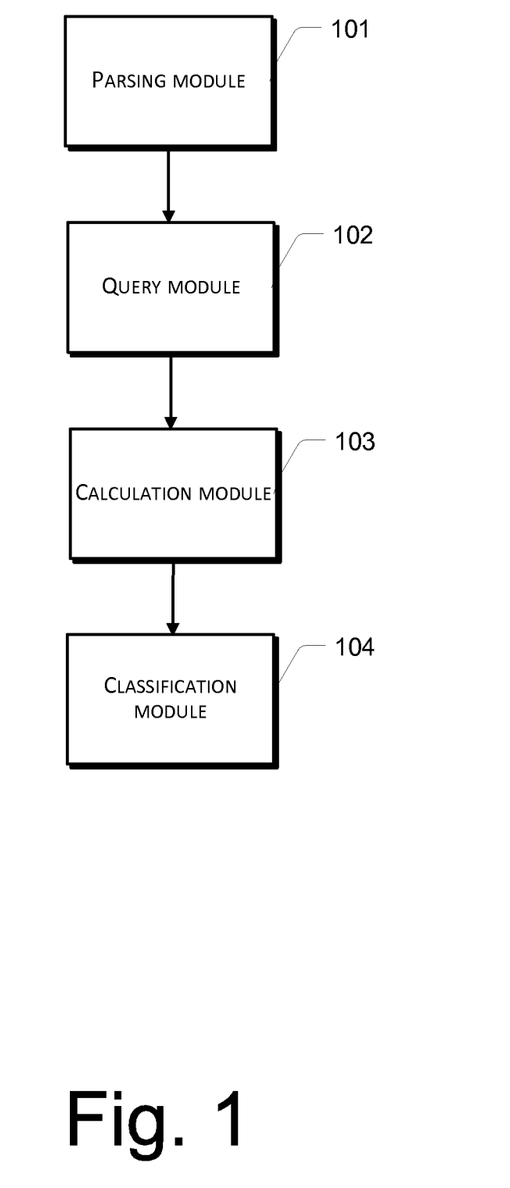
FIG. 1 shows a system diagram of an apparatus according to an embodiment of the present disclosure.

As shown in FIG. 1, an apparatus for text classification according to an embodiment of the present disclosure is provided. In one embodiment, the apparatus comprises one or more servers. For example, the apparatus may be implemented in a processor-based server that includes one or more computer-readable storage media, such as memories, and communication means to communicate to a network and other devices and apparatuses connected to the network. The apparatus comprises: a parsing module 101, a query module 102, a calculation module 103, and a classification module 104.

Parsing module 101 parses a text into various parsed words.

Query module 102 determines the vector of each parsed word, referred to as word vector, in the spherical space model. The word vector comprises the normalized word frequency value of this word in each category. The spherical space model uses the unit length as radius. Its dimensions are equal to the number of categories corresponding to the spherical space category vector. The unit length can be held constant in order to facilitate the calculation. In one embodiment, the radius of the spherical space model is 1. Here, the distance between the word vectors and category vectors may be that of a straight line or spherical arc.

Calculation module 103 determines the distance between the word vectors and category vectors for each category.

Classification module 104 classifies the text into one or more categories with the shortest distance.

Calculation module 103, when calculating the distance between the word vectors and category vectors, accumulates the normalized word frequency values of the word vectors in each category to obtain the total normalized word vectors.

Classification module 104 classifies the text into categories corresponding to the largest component of the normalized word vectors.

Figure 2:
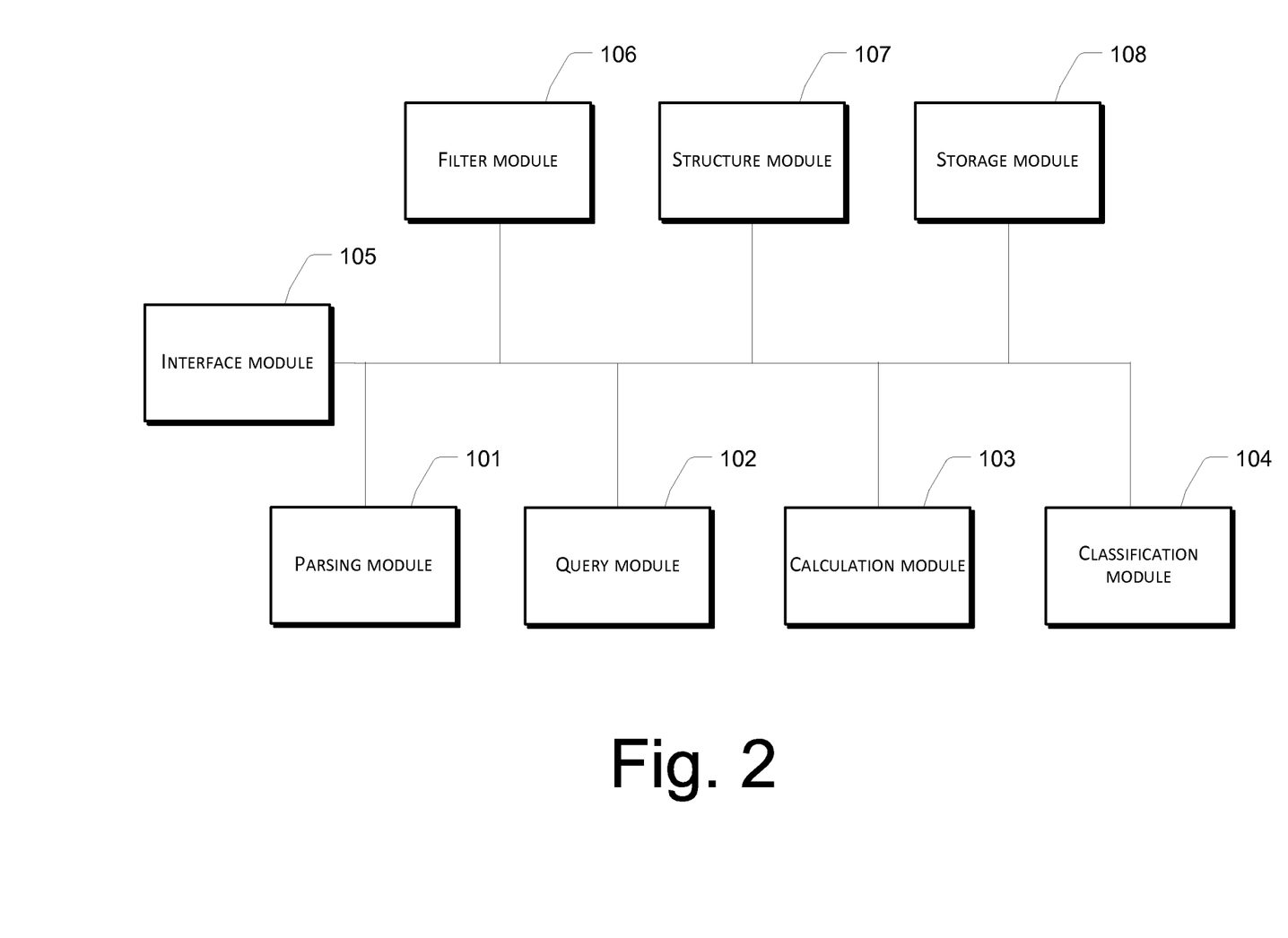
FIG. 2 shows a system diagram of the apparatus of FIG. 1 according to another embodiment of the present disclosure.

In other embodiments, the apparatus further comprises: an interface module 105, a filter module 106, a structure module 107, and a storage module 108, as shown in FIG. 2.

Interface module 105 acquires texts to be classified from one or more external sources.

Filter module 106 filters the various parsed words obtained from parsing to obtain words that meet the filtering conditions. There are many kinds of filtering conditions. For example, based on the coefficient of variation of a word that is calculated from the word frequency value of the word, the word will be filtered out if its coefficient of variation is greater than a coefficient of variation threshold (e.g., 0.5). Through the coefficient of variation, those words having respective frequency values that do not vary much (such as the words "you", "I" that have basically unvarying word frequency values under different categories) can be filtered out, while those words with significant variation in word frequency values (such as professional jargons, which appear more in the corresponding professional categories than in others) can be retained. Words with varying frequency value occur mainly in one or several categories. These words contribute to the accuracy of text categorization. In one embodiment, these words are classified as "outstanding" words, which can be retained after filtering. There may also be other filtering conditions that are not listed here in the interest of brevity.

Structure module 107 constructs the spherical space model.

Storage module 108 stores the spherical space model, as well as the classification of every text.

The process by which the structure module 107 constructs the spherical space model is described below.

Given a multi-dimensional spherical space S, the dimensions of S and the total number of categories are the same. Category Ci is the sphere endpoint and at the same time corresponds to the spherical space category vector. $Ci=(0 \ldots 0, 1, 0 \ldots 0)$ is equivalent to the core (also called origin) that moves towards the spherical endpoint. The category vector of the ith dimension is 1 and the rest are 0. Assuming that a word emerged from two categories Ci and Cj that are statistically independent, then Ci and Cj in S must be perpendicular to each other. Thus, in general, the rest of the category vectors (Ci) are orthogonal to each other.

Figure 3:
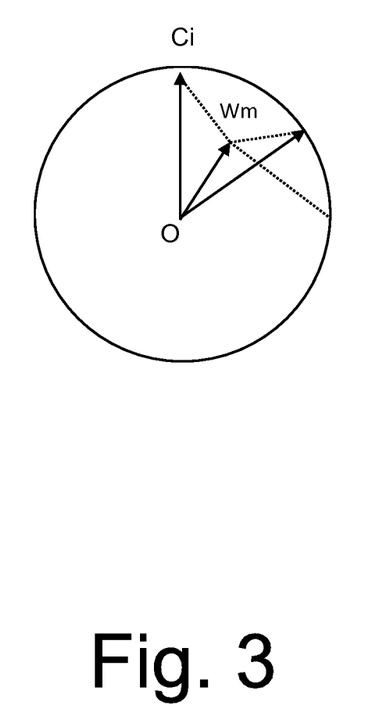
FIG. 3 shows a spherical space diagram according to an embodiment of the present disclosure.

The word vector Wm of the mth word is the vector of S in the present disclosure. In m=1 . . . M, M is the total number of words, while in Wm=(V1, V2 . . . VN), Vi is the normalized word frequency value of the category Ci. i=1 . . . N, where N is the total number of categories. The normalized word frequency values from the core towards the spherical endpoint can indicate the coordinates of the category Ci. The diagram of the word vector and the category vector is shown in FIG. 3. As shown in FIG. 3, Ci, Cj and Ck illustrate the three vectors of the category wherein O is the core or the origin with coordinates at $\{0, 0 \ldots 0\}$.

The present disclosure establishes that any amount of semantic information of a word is constant. The amount of semantic information may depend on either the perception of the main subject or representation of the existing object. The unit length is defined as constant and the length of the word vector in S (i.e., the distance of the endpoint of word vector from the origin O) is also constant. For convenience, the constant is set to 1. The distance of the endpoint of word vector from the origin O can be expressed as: $|Wm-O|=1$ (Formula 1), then based on $Wm=(V1, V2 \ldots VN)$, there is $\Sigma Vi^2=1$ (Formula 2). It is because of Formula 1 that one can know that the word vector Wm's endpoints fall within the sphere. Since the endpoints of the word vector Wm and the category vector Ci fall within the sphere, any semantic of a word and category can use the distance of Wm and Ci to express the degree of similarity. The shorter the distance, the closer they are. The distance of Wm and Ci can be calculated by means of straight line or spherical arc.

Because any amount of semantic information of a word is constant, the value of the word frequency have been normalized to obtain $\sqrt{\Sigma(Fi \times k)^2}=1$, subsequently there is $\Sigma(Fi \times k)^2=1$, where Fi is the word frequency value of the word in the category Ci and k is the default normalization factor. From $\Sigma(Fi \times k)^2=1$, $$k = \sqrt{\frac{1}{\Sigma Fi^2}} \quad \text{(Formula 3)}$$

can be derived. Consequently, from $Vi=Fi \times k$ (Formula 4), one can obtain the word vector and word frequency value of the conversion function (or quantitative function) $Wm=\delta(Fi)=(Fi) \times k$ (Formula 5).

As discussed above, structure module 107 uses the origin of the spherical structure as the core. With unit length l as the radius of the spherical space, the endpoints of the word vector Wm and the category vector Ci fall within the sphere. The spherical space model can be directly applied to train and review samples. The sample training process and text categorization process can be implemented by other pattern recognition or artificial means.

With regards to text D, $D=\Sigma Wm$, Wm is the word vector of the mth word. Calculation module 103 computes the distance of $\Sigma Wm$ and the category vector Ci. Texts are classified under one or more categories with the shortest distance. Since $\Sigma Wm$ does not necessarily fall on the sphere, in order to facilitate the calculation, calculation module 103 can normalize D by multiplying the normalization factor k, then calculate the distance to the category vector Ci.

The shorter the distance between the word vector Wm and the category vector Ci, the degree of similarity between the two is greater. In order to simplify the calculation, it can be set that $P=(Pi)=(\Sigma Vmi)$ (Formula 6), Pi being the ith component of the weight categories. The greater the Pi, the shorter the distance to the category vector Ci is. Similarly, the greater $\Sigma Vmi$, the shorter the distance to the category vector Ci is. Therefore, calculation module 103 accumulates the normalized value of the multiple words in a category and obtains the weight value of such category. Classification module 104 will classify the text into categories corresponding to the maximum weight value.

The principle behind the correlation between larger Pi and shorter distance of category vector Ci is discussed below.

Since $D=\Sigma Wm$ and $Wm=(V1, V2 \ldots VN)$, it follows that $D=(\Sigma Vm1, \Sigma Vm2, \ldots, \Sigma Vmi, \ldots, \Sigma Vmn)$ where $\Sigma Vmi$ is the sum of all the normalized word frequency values in the document in the ith category. Moreover, with $Pi=\Sigma Vmi$, $D=(Pi)$. The distance of D to Ci can be expressed as:

$$\begin{aligned}
|D - Ci| &= |\{P1, P2, \ldots Pi, \ldots, Pn\} \times k - \{0, 0, \ldots, 0, 1, 0, \ldots, 0\}| \\
&= k \times |\{P1, P2, \ldots Pi, \ldots, Pn\} - \{0, 0, \ldots, 0, 1/k, 0, \ldots, 0\}| \\
&= k \times sqrt((P1-0)^2 + (P2-0)^2 + \ldots + (Pi - 1/k)^2 + \ldots + (Pn-0)^2) \\
&= k \times sqrt(P1^2 + P2^2 + \ldots + (Pi^2 - 2Pi/k + 1/k^2) + \ldots + Pn^2) \\
&= k \times sqrt(\Sigma(Pi^2) - 2Pi/k + 1/k^2) \\
&= sqrt(\Sigma((Pi \times k)^2) - 2K \times Pi + 1)
\end{aligned}$$

Since $\Sigma((Pi \times k)^2)=1$, it follows that $sqrt(\Sigma((Pi \times k)^2)-2K \times Pi+1)=sqrt(1-2K \times Pi+1)=sqrt(2*(1-K \times Pi))$. This proves that the distance from D to Ci and Pi are inversely proportional. For instance, the category with the largest Pi is the one which is most proximate to D.

The aforementioned apparatus can be implemented in a single computer or in multiple computers with one or more components of the aforementioned apparatus implemented in each of the multiple computers. The functionality of the aforementioned apparatus can be achieved by coordinating the one or multiple computers. Each component can be implemented either in the form of software, hardware, or both.

The internal structure and functionality of the text classification apparatus has been described above. An implementation process of text classification will now be described.

Figure 4:
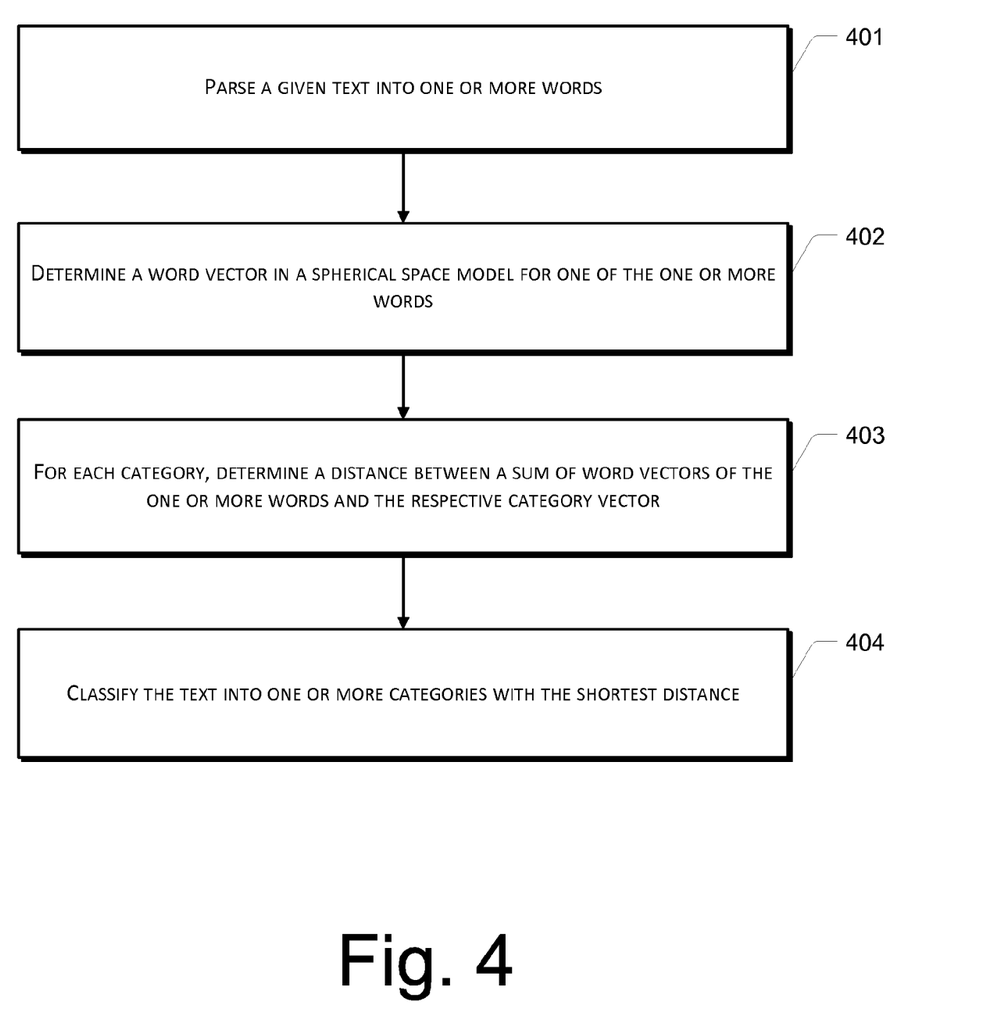
FIG. 4 shows a flow chart of a primary method for text classification according to an embodiment of the present disclosure.

As shown in FIG. 4, the main method according to an embodiment of the present disclosure comprises:

At 401, a given text is parsed into one or more words.

At 402, a respective word vector in the spherical space model corresponding to each of the one or more words is determined Each of the word vectors comprises the normalized word frequency value of the respective word in each category. The spherical space model uses the unit length as radius of the multi-dimensional sphere model. Its number of dimensions is equal to the number of categories, and the categories correspond to the spherical spatial category vectors.

At 403, for each category, the distance between the sum of the one or more word vectors and the category vector is determined.

At 404, the text is classified into one or more categories with the shortest distance.

The present disclosure provides text classification using the aforementioned distance and word vectors. Each of these two methods will now be described.

Figure 5:
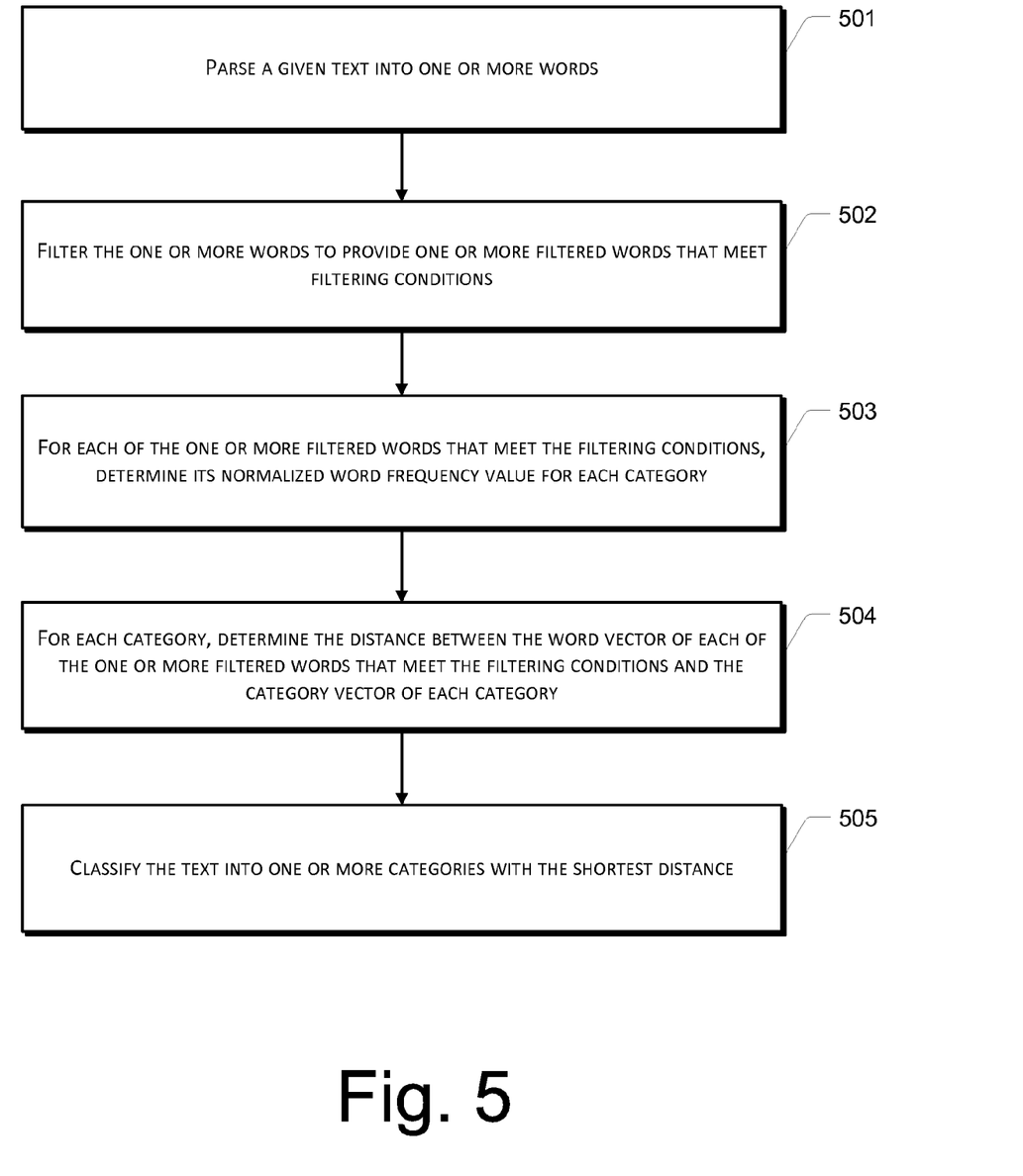
FIG. 5 shows a flow chart of a distance method for text classification according to an embodiment of the present disclosure.

As shown in FIG. 5, a method for text classification according to the distance comprises a number of actions as described below.

At 501, a given text is parsed into one or more words.

At 502, the one or more words are filtered to result in one or more filtered words that meet the filtering conditions. Filter module 103 can filter words based on the word frequency value of each word being filtered. There may be many filter conditions such as the retention of those with word frequency value greater than a default value in all categories. Another condition is when the normalized word vector in the largest component (i.e. the maximum normalized word frequency value) is greater than the word frequency threshold. There may also be other filter conditions that are not listed here.

At 503, for each of the one or more filtered words that meet the filtering conditions, its normalized word frequency value for each category is determined. In particular, the normalized word frequency value for a word in each category is pre-stored. In the event that a word cannot be found from a search, then its normalized word frequency value will be set to 0 for all categories. If the word frequency value, rather than the normalized word frequency value, of a word is pre-stored for each category, then the query module 102 can be used to search for the word frequency values in order to normalize them to provide corresponding normalized word frequency values. Formula 4 provides an example of a specific implementation. Additionally, interfering words (such as rare words and common words, etc.) can be filtered out as an attempt to leave more technical jargon words to optimize the text classification.

At 504, for each category, the distance between the word vector of each of the one or more filtered words that meet the filtering conditions and the category vector of each category is determined. This distance may be a straight line or spherical arc.

Prior to 504, a sum of the word vectors can be normalized to allow the normalized sum of word vectors to fall within the spherical space. Then, at 504, a distance between the normalized sum of word vectors and the category vector of each category can be determined.

At 505, the text is classified into one or more categories with the shortest distance.

There can be further classification of categories in the database based on stored texts.

Figure 6:
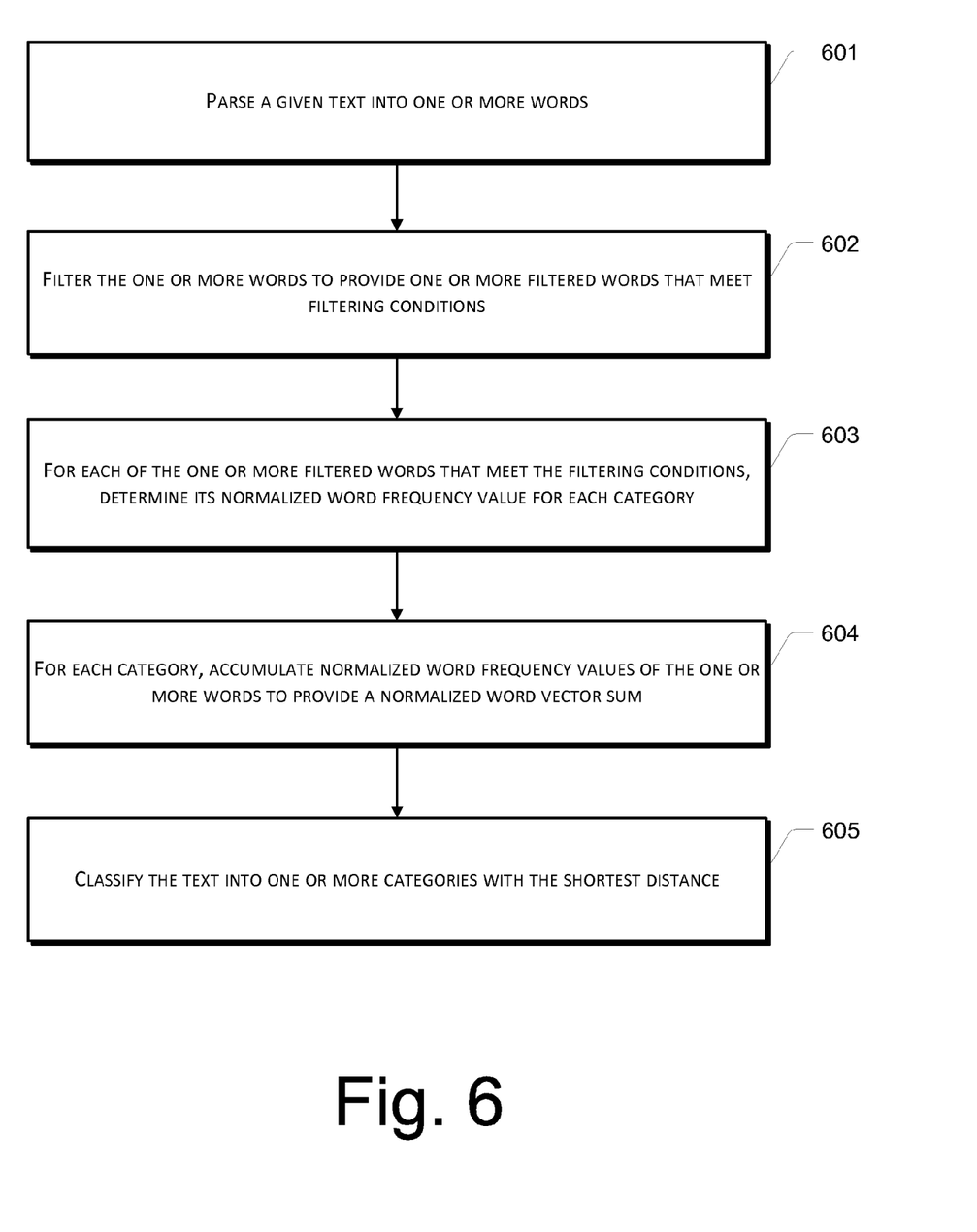
FIG. 6 shows a flow chart of a vector sum method for text classification according to an embodiment of the present disclosure.

As shown in FIG. 6, a vector sum method for text classification comprises a number of actions as described below.

At 601, a given text is parsed into one or more words.

At 602, the one or more words are filtered to result in one or more filtered words that meet the filtering conditions.

At 603, for each of the one or more filtered words that meet the filtering conditions, its normalized word frequency value for each category is determined. In particular, the normalized word frequency value for a word in each category is pre-stored.

At 604, for each category, normalized word frequency values of the one or more words are accumulated to provide a normalized word vector sum. Formula 6 provides an example of a specific implementation.

At 605, the text is classified into categories corresponding to the largest component(s) of the normalized word vector sum.

When one or more of the embodiments of the present disclosure are implemented in the form of computer-executable software, code, or instructions, such software, code, or instructions can be stored in one or more computer-readable storage media such as a floppy disk, hard disk, CD-ROM, flash memory, or other non-transitory storage medium. When executed by one or more computers, the software, code, or instructions may cause the one or more computers to perform embodiments of the text classification method described above.

The present disclosure improves VSM by pre-constructing the spherical space model. Moreover, this process calculates the distance between resultant word vector and the category vector. It also determines the category of the text. The present disclosure also implements text classification. In addition, with the angle cosine algorithm, the amount of calculation is substantially lessened. Moreover, the unit length acts as the radius of the spherical space model. The square sum of the normalized word frequency value of the words in each category can also be the unit length. The unit length is equivalent and limited to the semantic information quantity of the words. Accordingly, this method can improve the text classification accuracy of existing technologies.

With more accurate text classification, efficiency in text classification as well as search and retrieval of text can be greatly improved.

A person of ordinary skill in the art can alter or modify the present disclosure in many different ways without departing from the spirit and the scope of this disclosure. Accordingly, it is intended that the present disclosure covers all modifications and variation which falls within the scope of the claims of the present disclosure and their equivalent.

What is claimed is:

1. A method comprising:
   parsing a text into one or more words;
   filtering the one or more words to obtain one or more filtered words prior to classification of the text, the filtering comprising:
   determining an amount of variation of frequencies of appearance associated with a word of the one or more words across a plurality of categories; and
   filtering out the word in response to determining that the amount of variation is less than a first variation threshold and greater than a second threshold, wherein the second threshold is greater than zero;
   determining a word vector in a pre-constructed spherical space model for each filtered word of the one or more filtered words, a number of dimensions of the spherical space model being equal to a number of the plurality of categories;
   determining a distance between a sum of word vectors of the one or more filtered words and a respective category vector associated with each category of the plurality of categories in the spherical space model, determining the distance including accumulating normalized word frequency values of the one or more filtered words to obtain a normalized word vector sum; and
   classifying the text into one or more categories based at least in part on the determined distance associated with each category, classifying the text including classifying the text into a category corresponding to a largest component of the normalized word vector sum.

2. The method as recited in claim 1, wherein the distance between the sum of word vectors of the one or more filtered words and the respective category vector comprises a straight line or a spherical arc.

3. The method as recited in claim 1, wherein a word vector of a filtered word comprises one or more normalized word frequency values of the filtered word in respective one or more categories.

4. The method as recited in claim 1, wherein filtering the one or more words further comprises retaining another word of the one or more words which frequencies of appearance vary across the plurality of categories at an amount greater than the first variation threshold.

5. The method as recited in claim 1, wherein the amount of variation associated with the word comprises a coefficient of variation of the word, and the method further comprises calculating one or more coefficients of variations of the one or more words based on respective word frequency values of the one or more words.

6. An apparatus comprising:
one or more processors;
memory;
a parsing module stored in the memory and executable by the one or more processors that parses a text into one or more words;
a filter module stored in the memory and executable by the one or more processors that filters the one or more words to provide one or more filtered words prior to classification of the text, wherein the filter module filters a word of the one or more words which frequencies of appearance vary across a plurality of categories at an amount less than a first variation threshold and greater than a second variation threshold, the second variation threshold being greater than zero;
a query module stored in the memory and executable by the one or more processors that determines a word vector in a pre-constructed spherical space model for each filtered word of the one or more filtered words, a number of dimensions of the spherical space model being equal to a number of the plurality of categories;
a calculation module stored in the memory and executable by the one or more processors that determines a distance between a sum of word vectors of the one or more filtered words and a respective category vector for each category, and accumulates normalized word frequency values of the one or more filtered words to obtain a normalized word vector sum; and
a classification module stored in the memory and executable by the one or more processors that classifies the text into one or more categories based on the determined distance of each category, the one or more categories corresponding to a largest component of the normalized word vector sum.

7. The apparatus as recited in claim 6, wherein the distance between the sum of word vectors of the one or more filtered words and the respective category vector comprises a straight line or a spherical arc.

8. The apparatus as recited in claim 6, wherein a word vector of a filtered word comprises one or more normalized word frequency values of the filtered word in respective one or more categories.

9. The apparatus as recited in claim 6, wherein the filter module is further configured to retain another word of the one or more words which frequencies of appearance vary across the plurality of categories at an amount greater than the first variation threshold.

10. The apparatus as recited in claim 6, wherein the amount of variation associated with the word comprises a coefficient of variation of the word, and the filter module calculates one or more coefficients of variations of the one or more words based on respective word frequency values of the one or more words.

11. One or more computer-readable storage media having stored thereupon computer-executable instructions that, when executed by one or more processors, cause the one or more processors to perform acts comprising:
parsing a text into one or more words;
filtering the one or more words into one or more filtered words prior to classification of the text, the filtering comprising:
determining an amount of variation of frequencies of appearance of a word of the one or more words across a plurality of categories associated with a pre-constructed spherical space model, a number of dimensions of the spherical space model being equal to a number of the plurality of categories; and
filtering the word based at least in part on whether the amount of variation is less than a first variation threshold and greater than a second variation threshold, the second variation threshold being greater than zero;
determining a word vector in the spherical space model for each filtered word of the one or more filtered words;
determining a distance between a sum of word vectors of the one or more filtered words and a respective category vector of each category of the plurality of categories, determining the distance including accumulating normalized word frequency values of the one or more words to obtain a normalized word vector sum; and
classifying the text into one or more categories based at least in part on the determined distance associated with each category, classifying the text including classifying the text into a category corresponding to a largest component of the normalized word vector sum.

12. The one or more computer-readable storage media as recited in claim 11, wherein the distance between the sum of word vectors of the one or more filtered words and the respective category vector comprises a straight line or a spherical arc.

13. The one or more computer-readable storage media as recited in claim 11, wherein a word vector of a filtered word comprises one or more normalized word frequency values of the filtered word in respective one or more categories.

14. The one or more computer-readable storage media as recited in claim 11, wherein the amount of variation associated with the word comprises a coefficient of variation of the word, and the acts further comprise calculating one or more coefficients of variations of the one or more words based on respective word frequency values of the one or more words.

15. The one or more computer-readable storage media as recited in claim 14, wherein filtering the one or more words into one or more filtered words comprises retaining a word of the one or more words which coefficient of variation is greater than a threshold.

\* \* \* \* \*